United States Patent
Kashkoush et al.

(10) Patent No.: US 6,766,818 B2
(45) Date of Patent: Jul. 27, 2004

(54) CHEMICAL CONCENTRATION CONTROL DEVICE

(75) Inventors: Ismail Kashkoush, Orefield, PA (US); Richard Novak, Plymouth, MN (US); Timothy J. Helmer, Allentown, PA (US)

(73) Assignee: Akrion, LLC, Allentown, PA (US)

( * ) Notice: Subject to any disclaimer, the term of this patent is extended or adjusted under 35 U.S.C. 154(b) by 91 days.

(21) Appl. No.: 10/117,725

(22) Filed: Apr. 5, 2002

(65) Prior Publication Data

US 2002/0144727 A1 Oct. 10, 2002

Related U.S. Application Data

(60) Provisional application No. 60/282,350, filed on Apr. 6, 2001.

(51) Int. Cl.[7] .............................................. G05D 11/08
(52) U.S. Cl. ............................ 137/3; 137/93; 118/715; 156/345.24
(58) Field of Search ................................ 137/3, 88, 93, 137/4, 92; 156/345.15, 345.18, 345.24, 345.26; 216/83, 93; 438/745; 700/265, 285

(56) References Cited

U.S. PATENT DOCUMENTS

| | | | | |
|---|---|---|---|---|
| 3,074,277 A | * | 1/1963 | Hill ................................ 137/3 |
| 4,060,097 A | * | 11/1977 | Oxford .................. 156/345.18 |
| 4,091,834 A | * | 5/1978 | Frigato ........................ 137/93 |
| 4,980,017 A | * | 12/1990 | Kaji et al. ..................... 216/93 |
| 5,437,710 A | * | 8/1995 | Grant et al. .................... 95/12 |
| 5,674,410 A | * | 10/1997 | Nakajima et al. ....... 156/345.18 |
| 5,921,263 A | * | 7/1999 | Negley, III .................... 137/3 |
| 5,924,794 A | * | 7/1999 | O'Dougherty et al. ........ 137/93 |
| 6,001,216 A | * | 12/1999 | Lee ........................ 156/345.18 |
| 6,013,156 A | | 1/2000 | Holbrook et al. |
| 6,017,827 A | * | 1/2000 | Morgan et al. ............. 438/745 |
| 6,050,283 A | * | 4/2000 | Hoffman et al. ................ 137/3 |
| 6,200,414 B1 | | 3/2001 | Hwang et al. |
| 6,247,838 B1 | * | 6/2001 | Pozniak et al. ................ 137/5 |
| 6,415,803 B1 | * | 7/2002 | Sundin et al. .............. 134/113 |
| 6,497,238 B1 | * | 12/2002 | Knotter ................. 156/345.18 |
| 6,610,213 B1 | * | 8/2003 | Schwab et al. ................ 216/83 |

* cited by examiner

*Primary Examiner*—Ramesh Krishnamurthy
(74) *Attorney, Agent, or Firm*—Michael B. Fein; Brian L. Belles; Cozen O'Connor

(57) ABSTRACT

A system and method for ensuring constant concentration ratios in multi-fluid mixtures used in wafer processing steps. In one aspect the invention is a method for supplying a multi-fluid mixture to a process tank comprising: transporting a first fluid through a first supply line having means to control mass flow rate of the first fluid; transporting a second fluid through a second supply line having means to control mass flow rate of the second fluid; converging the first and second fluids to form a multi-fluid mixture; repetitively measuring the concentration levels of the first and second fluids in the multi-fluid mixture with a sensor; and upon the sensor detecting undesirable concentration levels of either the first or second fluid in the multi-fluid mixture, automatically adjusting the mass flow rate of at least one of the first and second fluids to achieve desired concentration levels.

23 Claims, 5 Drawing Sheets

CHEMICAL CONCENTRATION CONTROL DEVICE

CROSS-REFERENCE TO RELATED APPLICATION

The benefit of Provisional Application No. 60/282,350, filed Apr. 6, 2001, is claimed.

BACKGROUND OF THE INVENTION

This invention relates generally to the field of manufacturing integrated circuits and specifically to apparatus and methods of measuring and controlling the concentration ratios for multi-fluid mixtures used in wafer processing.

In the manufacture of semiconductors, semiconductor devices are produced on thin disk-like objects called wafers. In order to produce properly functioning devices, these wafers are subjected to a number of process steps during their manufacture. For a variety of reasons, many of these process steps are performed in process tanks. For example, process tanks are used in the steps of chemical etching, photoresist stripping, cleaning/rinsing, and wafer drying to name a few. Most, if not all, of these steps require the use of one or more specific processing liquids. There is a wide variety of processing liquids, such as deionized water, RCA standard clean 1, RCA standard clean 2, ammonium hydroxide, hydrochloric acid, hydrochloric acid, or hydrogen peroxide. The exact liquid used depends on the particular step to be performed and the particular devices to be produced.

In many of these process steps, it is preferable that the processing liquids have a dissolved gas contained therein. Dissolving a gas in the processing liquid can result in a number of benefits, including: (1) improving the results sought to be achieved by that step; or (2) decreasing the time necessary to achieve the necessary results of that step. Moreover, some processing steps can not be performed effectively at all without dissolving a gas in the particular processing liquid. One example of a process step that uses a liquid containing a dissolved gas is the process of photoresist stripping using ozonated deionized water. In this step, ozone gas is dissolved into liquid deionized water. This multi-fluid mixture (i.e. the liquid deionized water containing the dissolved ozone) is then applied to wafers located in a process tank. As used in this patent, the term "fluid" encompasses both a liquid and a gas. As such, the term "multi-fluid mixture" includes any mixture that contains at least two different chemical compounds, including liquid-gas mixtures, liquid-liquid mixtures, or gas-gas mixtures. It should be noted that the principles set forth in this patent apply to any of these "multi-fluid mixture" embodiments. However, for reasons of simplicity and clarity, both the prior art and the invention will be described herein with respect to a liquid having a gas dissolved therein.

In the manufacturing steps in which a liquid containing a dissolved gas are used, it is imperative that the concentration ratio of dissolved gas to liquid remain constant at all times. This "constant concentration" requirement applies not only to the time during which a particular batch of wafers is processed, but also must be maintained from wafer batch to wafer batch. Non-constant concentration ratio can result in non-uniform etching, inconsistent stripping rates, and a host of problems that can cause devices to fail. As such, it is well established in the industry that keeping the concentration ratio of gas to liquid constant in multi-fluid mixtures is a must. However, because it is standard for a single gas or liquid reservoir to supply the necessary gas or liquid to multiple pieces of equipment simultaneously, the gas and liquid supply lines that lead into a particular piece of equipment undergoes continuous changes in pressure. Changes in pressure affect flow rates, which in turn will affect the gas and liquid concentration levels as they enter the equipment. As such, systems that maintain constant concentration levels must be employed.

Currently, constant concentration levels are maintained in multi-fluid processing mixtures by employing a separate means to control the mass flow rate on both the gas supply line and the liquid supply line. This can be done using a mass flow controller or a pressure regulator in series with a flow meter on each supply line. A simplified embodiment of one such prior art system is shown in FIG. 1. It is well known in the art that by combining a flow meter and a pressure regulator in series on a variable pressure fluid supply line, the fluid mass flow rate through that supply line can be controlled, be it a liquid or a gas. In prior art systems, a separate sub-system controller is coupled to the flow meter, and the pressure regulator of each supply line in order to facilitate mass flow control for that line. As such, in using prior art systems as illustrated in FIG. 1, a user separately establishes the mass flow rates for the liquid and the gas. The gas and liquid then independently flow into the process tank at their respectively established mass flow rates, forming a multi-fluid mixture (i.e. a liquid with a dissolved gas). It is in this way that prior art systems attempt to achieve constant concentrations of gas and liquid in the resulting multi-fluid mixture. However, this design has a number of drawbacks.

First, if for some reason either the gas mass control system or the liquid mass control system fails or becomes imprecise during wafer processing, there is no way to immediately fix the problem without disturbing the process. One must wait until the batch of wafers has gone through the entire failed process step. As such, an entire batch of wafers will be ruined. This can cost a manufacturer extraordinary amounts of money.

Second, because slight variations in the concentration ratio of the gas to liquid in the multi-fluid mixture can cause serious damage to semiconductor devices, personnel must constantly maintain the integrity of both the liquid mass control system and the separate gas mass control system. This can result in a significant usage of time, manpower, and money.

Finally, because prior art system merely set the mass flow rates of the gas and liquid, these systems can not be used to control the concentration ratio in re-circulation systems. This is because as the multi-fluid mixture is re-circulated back into the system and used again, the concentration ratio of the supplied liquid will be constantly changing, even though it is being moved through the supply line at a constant mass flow rate. As such, the concentration rate can not be controlled.

Thus, a need exists for a system and method that can automatically detect and adjust the concentration ratio of a multi-fluid mixture to ensure constant concentration ratio during a wafer processing step. This must be done without disturbing the process step.

SUMMARY OF THE INVENTION

These problems and others are solved by the present invention which in one aspect is a method for supplying a multi-fluid mixture to a process tank comprising: transporting a first fluid through a first supply line having means to control mass flow rate of the first fluid; transporting a second fluid through a second supply line having means to control mass flow rate of the second fluid; converging the first and second fluids to form a multi-fluid mixture; repetitively measuring the concentration levels of the first and second fluids in the multi-fluid mixture with a sensor; and upon the sensor detecting an undesirable concentration level in the multi-fluid mixture, the sensor automatically adjusting the mass flow rate of at least one of the first and second fluids to achieve a desired concentration level during wafer processing. The repetitive measurements of concentration levels can be many times per second, essentially continuously, or periodically according to a predetermined pattern.

Additionally, the method can further comprise the steps of filling the process tank with the multi-fluid mixture; overflowing the process tank with the multi-fluid mixture; and re-circulating the overflowed multi-fluid mixture back through the process tank, the re-circulated multi-fluid mixture being introduced back into circulation at a position downstream of the sensor.

Preferably, the first and second fluids converge to form a multi-fluid mixture prior to entering the process tank. In such an embodiment, the method will further comprise the step of transporting the multi-fluid mixture into the process tank. It is also preferable in this embodiment that the sensor be positioned to measure the concentration levels of the multi-fluid mixture before the multi-fluid mixture enters the process tank. Alternatively, the sensor can be positioned to measure the concentration levels of the multi-fluid mixture after the multi-fluid mixture enters the process tank.

Alternatively, the first and second fluids can be converged to form a multi-fluid mixture in the process tank itself.

Preferably, the first fluid is a liquid and the second fluid is a gas, wherein the sensor automatically adjusts the mass flow rate of the gas rather than the mass flow rate of the liquid. The gas can be carbon dioxide, ozone, nitrogen, chlorine, or flourine. The liquid can be deionized water, ammonium hydroxide, hydrochloric acid, hydrochloric acid, or hydrogen peroxide.

In another aspect, the invention is a system for supplying a multi-fluid mixture to a process tank comprising: a first supply line having means to control mass flow rate of a first fluid; a second supply line having means to control mass flow rate of a second fluid; wherein when the first supply line supplies the first fluid and second supply line supplies the second fluid, the first fluid and second fluid converge to form a multi-fluid mixture; a sensor for repetitively measuring the concentrations of the first and second fluids in the multi-fluid mixture; and a processor adapted to automatically adjust the mass flow rate control means of at least one of the first and second fluids when the sensor detects undesired concentration levels in the multi-fluid mixture.

It is preferable that the first fluid and second fluid converge to form the multi-fluid mixture as a result of the first and second supply lines merging into a tank inlet line prior to entering the process tank. Also preferably, the sensor is located on the tank inlet line. Alternatively, the first fluid and second fluid can converge to form the multi-fluid mixture in the process tank itself.

In regards to the system, it is preferable that the first fluid is a liquid and the second fluid is a gas, wherein the sensor is coupled to the mass flow rate control means of the gas rather than that of the liquid. The gas can be carbon dioxide, ozone, nitrogen, chlorine, or flourine. The liquid can be deionized water, ammonium hydroxide, hydrochloric acid, hydrochloric acid, or hydrogen peroxide. Finally, the means to control the mass flow rate of the first and second fluids can be mass flow controllers or a pressure regulator and a flow meter in series.

DETAILED DESCRIPTION OF THE DRAWINGS

Figure 3:
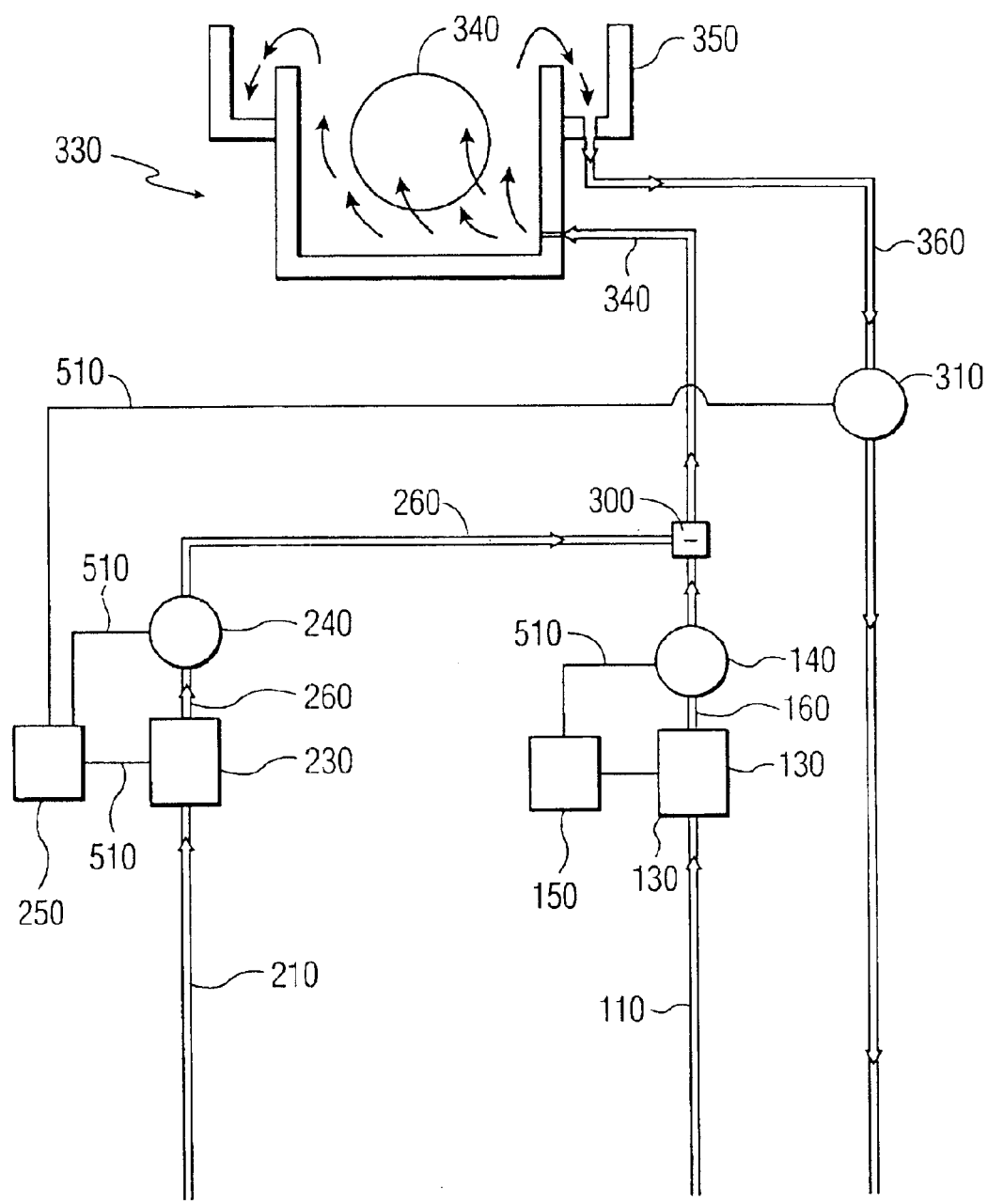
FIG. 3 is an alternative embodiment of the system of the present of the present invention, a self-correcting chemical concentration control system having re-circulation capabilities.
Figure 4:
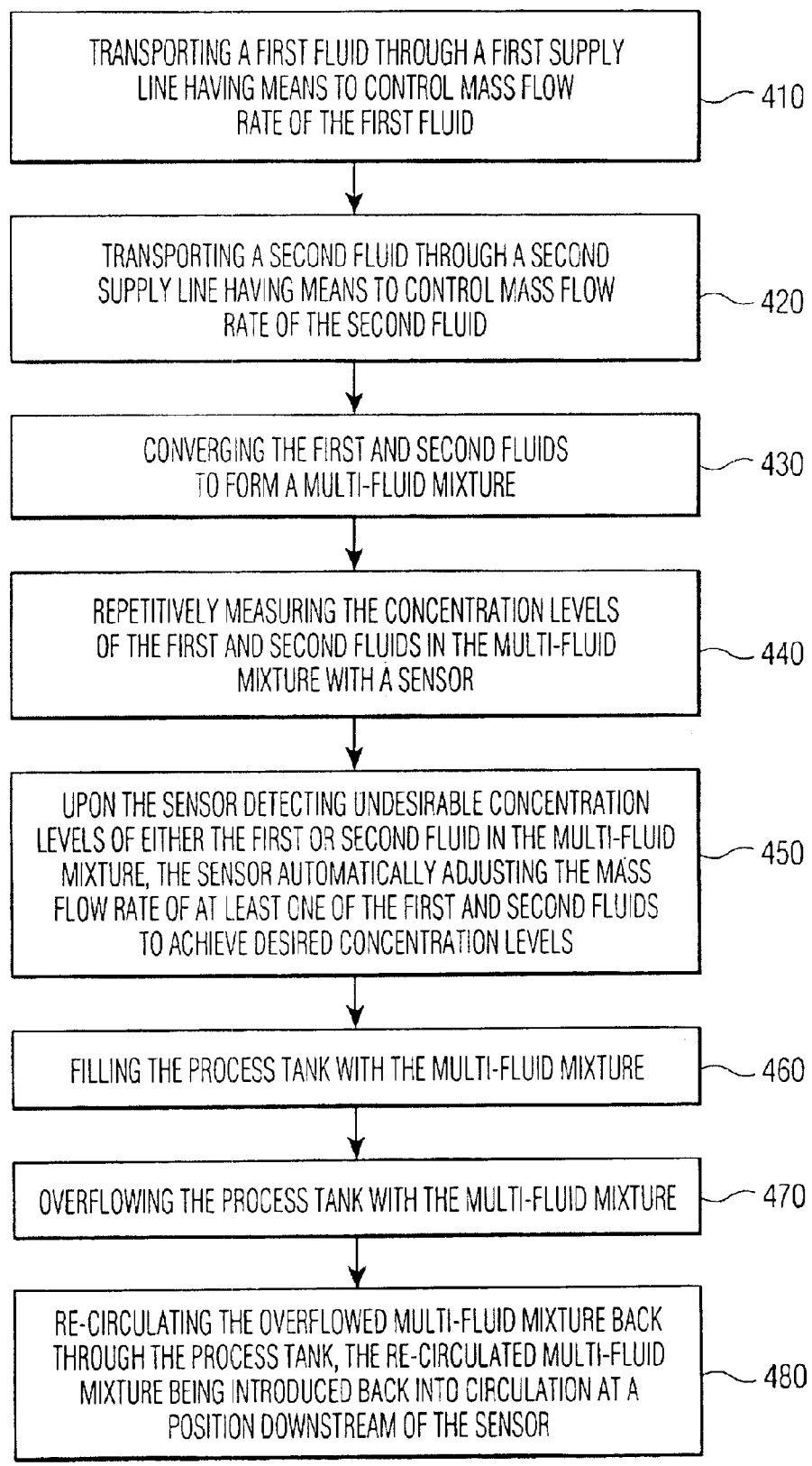
FIG. 4 is a flow diagram of an embodiment of the method of the present invention.

FIG. 4 is a flow diagram of an embodiment of the method of the present invention, a method of supplying a multi-fluid mixture having a constant concentration ratio to a process tank. FIG. 4 will be discussed herein in relation to the apparatus shown in FIGS. 2 and 3.

Figure 2:
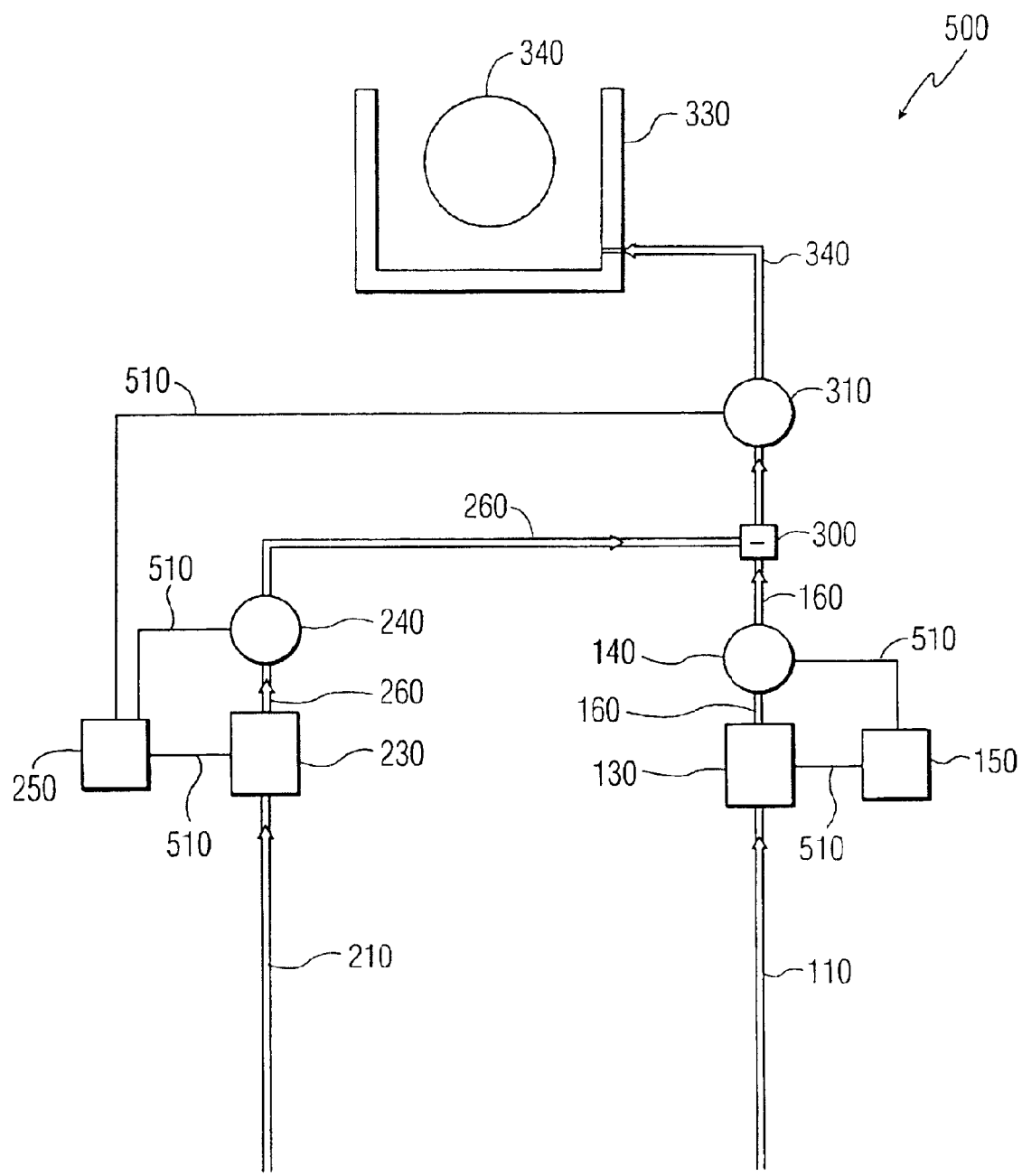
FIG. 2 is an embodiment of the system of the present invention, a self-correcting chemical concentration control system.

FIG. 2 illustrates an embodiment of the system of the present invention, self-correcting chemical concentration control system 500. Self-correcting chemical concentration system 500 comprises variable pressure liquid supply line 110, liquid pressure regulator 130, flow meter 140, liquid sub-system controller 150, and liquid supply line 160. Self-correcting chemical concentration system 500 further comprises variable pressure gas supply line 210, gas pressure regulator 230, flow meter 240, gas sub-system controller 250, and gas supply line 260. Additionally, self-correcting chemical concentration system 500 also comprises static mixer 300, concentration sensor 310, and multi-fluid supply line 320. Also illustrated in FIG. 2 is process tank 330 adapted for receiving semiconductor wafers or devices, having wafer 340 positioned therein and electrical connections 510.

Variable pressure liquid supply line 110 transports liquid from a liquid reservoir (not shown) to liquid pressure regulator 130 at changing pressures. The pressure variations in supply line 110 occur because the liquid reservoir is used to feed multiple pieces of equipment simultaneously. Liquid supply line 160 then provides a fluid connection between liquid pressure regulator 130, liquid flow meter 140, and static mixer 300. Variable pressure gas supply line 210 transports gas from a gas reservoir (not shown) to gas pressure regulator 230 at changing pressures. As with the liquid system, the pressure variations in gas supply line 210 occur because the gas reservoir is used to feed multiple pieces of equipment simultaneously. Gas supply line 260 provides a fluid connection between gas pressure regulator 230, gas flow meter 240, and static mixer 300. Multi-fluid line 340 fluidly connects static mixer 300 to process tank 330. Supply lines 110, 210, 260, 160, and 340 can be hermetically sealed pipes or flexible hoses and can be constructed of PVC, rubber, stainless steel, or plastic. The exact material of which supply lines 110, 210, 160, 260, and 340 are constructed will be dictated by the chemical properties (such as corrosiveness) of the liquid, gas, or multi-fluid mixture that is to be carried therethrough. The exact design requirements, such as cross-section size and length, of supply lines 110, 210, 160, 260, and 340 will dictated by variables such as flow rate requirements, equipment placement needs, etc.

In operating self-correcting chemical concentration system 500 in accordance with the present invention, variable liquid supply line 110 supplies a predetermined liquid to liquid pressure regulator 130. The exact identity of the liquid depends on the manufacturing step to be performed to wafer 340 in process tank 330. Examples of common processing liquids used in the semiconductor industry are deionized water, ammonium hydroxide, hydrochloric acid, hydrochloric acid, and hydrogen peroxide. Simultaneously, variable pressure gas supply line 210 also supplies gas pressure regulator 230 with a predetermined gas that the user desires to dissolve into the predetermined liquid at predetermined concentration levels. Examples of common gases that need to be dissolved in liquids in the semiconductor industry are carbon dioxide, ozone, nitrogen, chlorine, ammonia, and flourine. The exact identity of the gas will depend on the manufacturing step to be performed to wafer 340 in process tank 330. Moreover, those skilled in the art understand that not all combinations of these gases and liquids are desirable (or feasible) in manufacturing semiconductors.

Variable pressure liquid supply line 110 supplies liquid to pressure regulator 130 at variable pressures. The liquid is then transported through liquid supply line 160 from liquid pressure regulator 130, through liquid flow meter 140, and into static mixer 300. The direction of flow is indicated by the arrows. By placing liquid pressure regulator 130 and liquid flow meter 140 in series on liquid supply line 160, it is possible to control the mass flow rate of the liquid being pumped into static mixer 300. This mass flow control is accomplished by liquid sub-system controller 150 having properly programmed circuitry. Liquid sub-system controller 150 is electrically coupled to liquid pressure regulator 130 and liquid flow meter 140. This electrical coupling is accomplished by electrical connections 510. As such, liquid sub-system controller 150 can communicate back and forth with both liquid pressure regulator 130 and liquid flow meter 140. Moreover, the circuitry of liquid sub-system controller 150 is programmed so that upon receiving pressure and liquid flow data from liquid pressure regulator 130 and liquid flow meter 140, liquid sub-system controller 150 can control and adjust liquid pressure regulator 130 and liquid flow meter 140 as needed. Thus, a user can program liquid sub-system controller 150 to maintain a constant predetermined mass flow rate of the liquid into static mixer 300 for a predetermined period of time. It is in this way that step 410 of FIG. 4 is completed.

Figure 5:
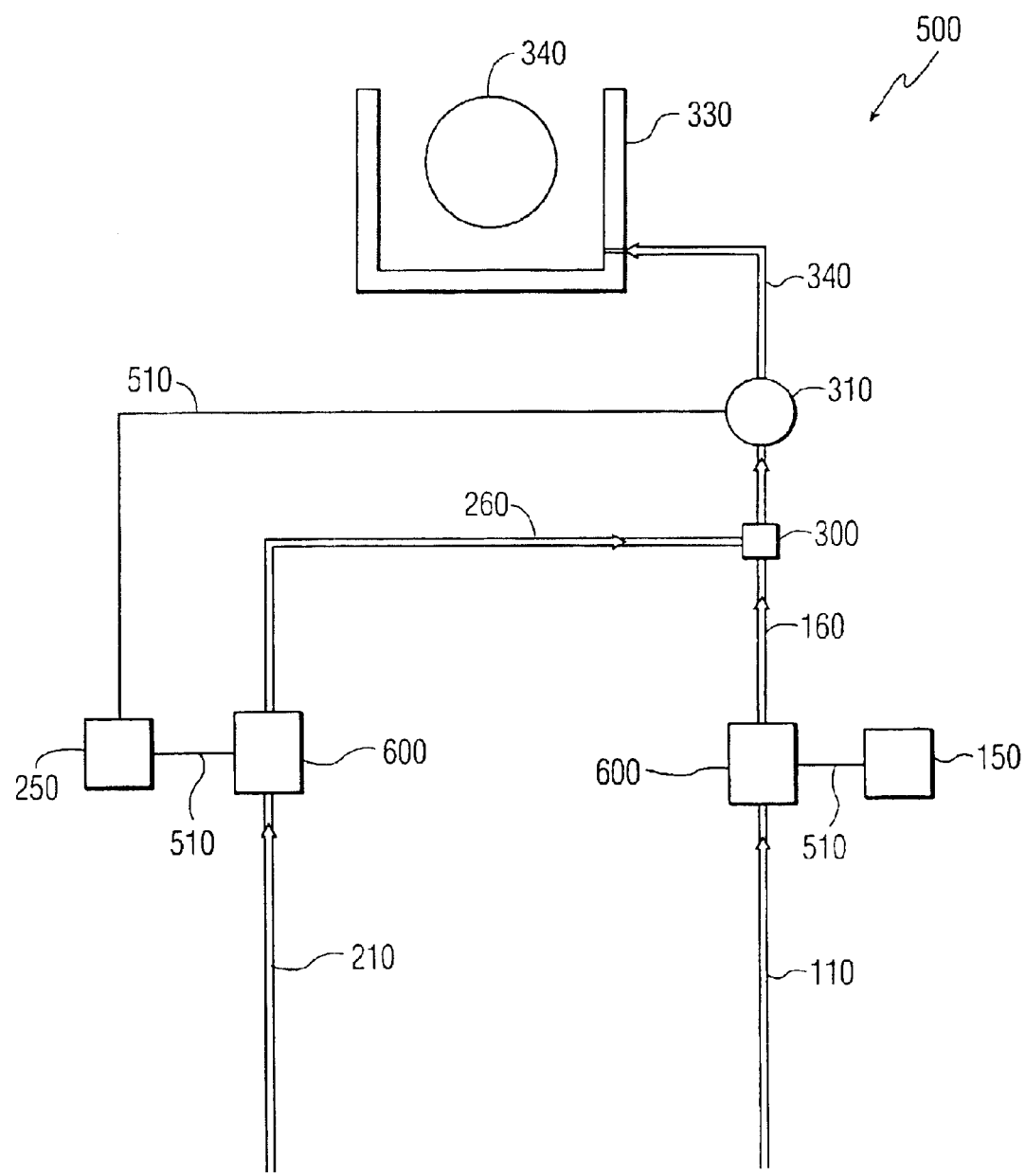
FIG. 5 is an embodiment of the system of the present of the present invention, a self-correcting chemical concentration control system having mass flow controllers.

Similarly, the mass flow rate of the gas from variable gas supply line 110 to static mixer 300 can be controlled using gas sub-system controller 250 to control gas pressure regulator 230 and gas flow meter 230. In order to avoid redundancy, a detailed explanation of this procedure is omitted with the understanding that the gas mass flow rate can be controlled in the same way as the liquid mass flow rate described above. As such, step 420 of FIG. 4 will be completed. While in the illustrated embodiment a pressure regulator is used in conjunction with a flow meter to control both the liquid and gas mass flow rates, those skilled in the art will appreciate that the mass flow rates can also be controlled with properly installed mass flow controllers 600 (FIG. 5). When using mass flow controllers 600 instead of pressure regulators and flow meters, the mass flow rate controllers will be coupled to the appropriate sub-system controller 150 or 250. Additionally, mass flow controllers 600 can have a processor built in, thus eliminating the need for a sub-system controller. As such, mass flow controller 600 would communicate directly with concentration sensor 310.

As discussed above, the mass flow rates of both the liquid and gas can be controlled by the appropriate subsystem controller 150, 250. This includes the ability to provide a constant mass flow rate of the corresponding fluid. As used herein throughout, the term "fluid" encompasses both a liquid and a gas. As a result of the ability to provide constant mass flow rates of both the liquid and gas to the static mixer, the multi-fluid mixture should have constant concentrations of gas and liquid throughout the process. However, for the reasons discussed in the background section above, merely having this setup can lead to a variety of problems.

To remedy the potential problems discussed above, the present invention employs the following: static mixer 300 and concentration sensor 310. These devices are installed and operated according to one embodiment of the present invention as described below.

Gas supply line 260 and liquid supply 160 transports the gas and liquid in the amounts dictated by sub-system controllers 150 and 250 into static mixer 300. The gas and liquid converge in static mixer 300. Static mixer 300 then mixes the incoming gas and liquid so as to form a substantially homogenous multi-fluid mixture, completing step 430 of FIG. 4. In the illustrated embodiment, the multi-fluid mixture is a liquid with a dissolved gas. However, the present invention can be used with any multi-fluid mixture, including gas-gas mixtures and fluid-fluid mixtures.

Once the multi-fluid mixture is produced in static mixer 300, static mixer 300 then outputs the multi-fluid mixture into multi-fluid supply line 340. Multi-fluid supply line 340 then transports the multi-fluid mixture into process tank 330 for processing of wafer 340. In FIG. 2, before the multi-fluid mixture enters process tank 330, it is analyzed by concentration sensor 310. In the illustrated embodiment of FIG. 2, concentration sensor 310 is fluidly connected to multi-fluid supply line 340. As the multi-fluid mixture passes through concentration sensor 310, concentration sensor 310 performs repetitive analysis of the multi-fluid mixture, continuously determining the concentration ratio of the gas to liquid in the multi-fluid mixture. As such, step 440 of FIG. 4 is completed. Concentration sensor 310 then communicates this data to gas subsystem controller 250 through electrical connection 510. Gas subsystem controller 250, which can be any processor such as an Intel Pentium, comprises properly programmable circuitry that constantly analyzes the incoming data to determine if the concentration ratios match a predetermined ratio. If the ratios match, then the gas mass flow rate is maintained at the previously established level. However, if the concentration ratio of gas to liquid in the multi-fluid mixture does not match the predetermined concentration ratio, then gas subsystem controller 250 is programmed to adjust the gas mass flow rate accordingly by adjusting gas pressure regulator 230. This will result in a new gas mass flow rate. As such, new concentration ratios of gas to liquid in the multi-fluid mixture will result. Concentration sensor 310 will still be analyzing the concentration ratio of the adjusted multi-fluid mixture and sending the data to gas subsystem controller 250. This process will be repeated so as to maintain the concentration levels of the liquid and gas in the multi-fluid mixture at the desired amounts. It is in this manner that step 450 of FIG. 4 is completed.

FIG. 3 shows an alternative embodiment of the system of the present invention. In this embodiment, process tank 330 comprises re-circulation weir 350. This enables the multi-fluid mixture to be re-circulated after it is used in process tank 330 to process wafers 340. In this embodiment, concentration sensor 310 is fluidly connected to re-circulation line 360 rather than multi-fluid line 340. However, concentration sensor 310 otherwise performs the same operation as described above. In using the system of FIG. 3, the-multi fluid mixture is supplied to process tank 330 in the same manner as described above, with the exception that the multi-fluid mixture does not pass through concentration sensor 310 before it enters process tank 330. The multi-fluid mixtures is supplied to process tank 330 so that it fills the processing chamber and overflows the walls. As such steps 460 and 470 of FIG. 4 are completed. The overflowing multi-fluid mixture is captured by re-circulation weir 350 and passed into re-circulation line 360. Re-circulation line 360 then transports the multi-fluid mixture back to the liquid reservoir to be re-circulated throughout the system 500. As such, step 480 of FIG. 4 is completed and the entire method starts over.

While in the illustrated embodiments, concentration sensor 310 is coupled to gas subsystem controller 250, it is also possible to achieve the same results by coupling concentration sensor 310 to liquid sub-system controller 150, or a combination of both sub-system controllers 250 and 150.

Figure 1:
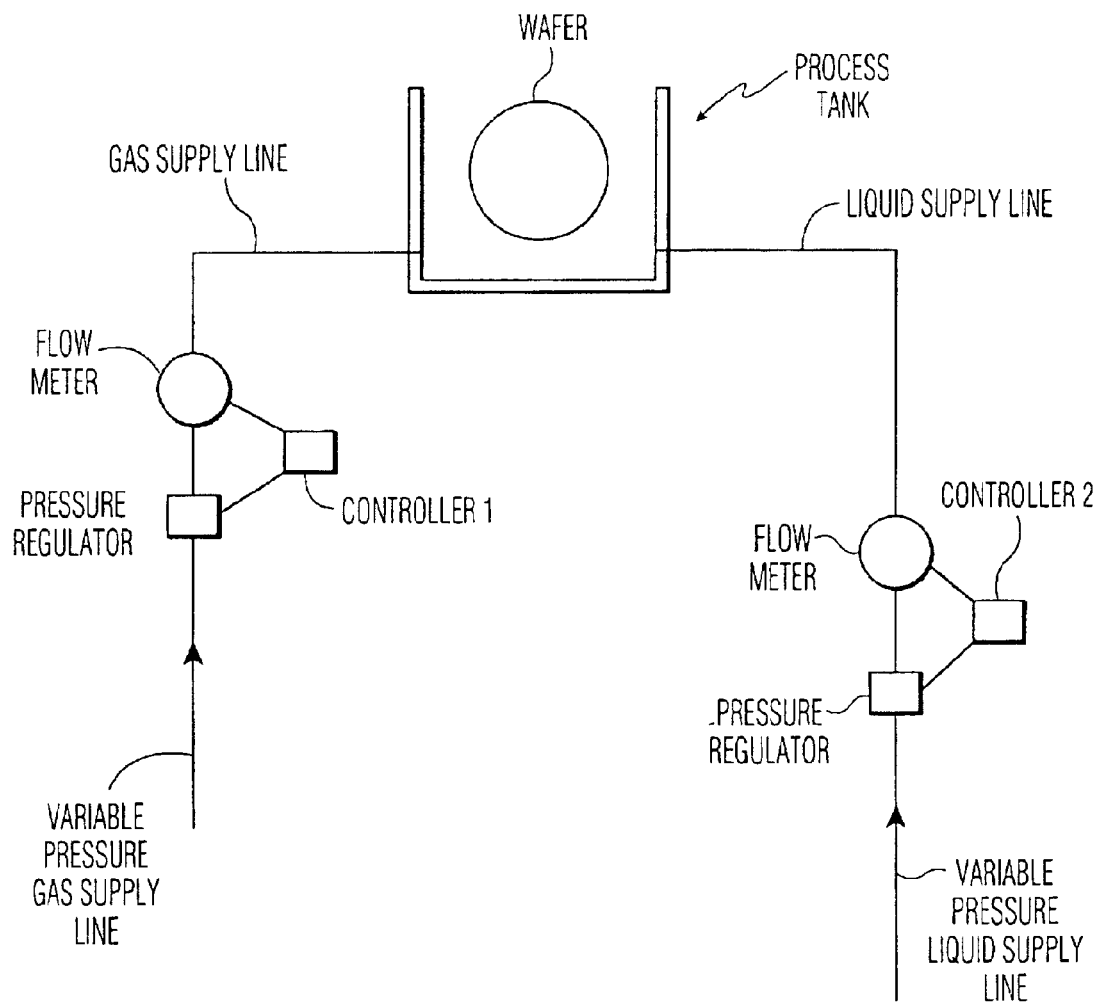
FIG. 1 is a prior art system used to control concentration levels of dissolved gas in liquid for multi-fluid mixtures.

The system of the prior art, as shown in FIG. 1, includes two separate controllers, one for each supply line. However, these two separate controllers act independent of the concentration levels of liquid and gas in the multi-fluid mixture. They merely provide constant mass flow rate. As such, they do not automatically adjust their mass flow rates to ensure a constant concentration ratio in the multi-fluid mixture.

The foregoing discussion discloses and describes merely exemplary embodiments of the present invention. As will be understood by those skilled in this art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for supplying a multi-fluid mixture to a substrate process tank comprising:
   transporting a first fluid through a first supply line having means to control mass flow rate of the first fluid;
   transporting a second fluid through a second supply line having means to control mass flow rate of the second fluid;
   converging the first and second fluids to form a multi-fluid mixture;
   repetitively measuring the concentration levels of the first and second fluids in the multi-fluid mixture with a sensor; and
   upon the sensor detecting undesirable concentration levels of either the first or second fluid in the multi-fluid mixture, continuously adjusting the mass flow rates of the first and second fluids during processing of at least one substrate in the multi-fluid mixture to achieve desired concentration levels.

2. The method of claim 1 comprising:
   filling the process tank with the multi-fluid mixture;
   overflowing the process tank with the multi-fluid mixture; and
   re-circulating the overflowed multi-fluid mixture back through the process tank, the re-circulated multi-fluid mixture being introduced back into circulation at a position downstream of the sensor.

3. The method of claim 1 comprising converging the first and second fluids to form a multi-fluid mixture prior to the first and second fluids reaching the process tank.

4. The method of claim 3 comprising transporting the multi-fluid mixture into the process tank.

5. The method of claim 4 comprising positioning the sensor to measure the concentration levels of the multi-fluid mixture before the multi-fluid mixture enters the process tank.

6. The method of claim 4 comprising positioning the sensor to measure the concentration levels of the multi-fluid mixture after the multi-fluid mixture enters the process tank.

7. The method of claim 1 comprising converging the first and second fluids to form a multi-fluid mixture in the process tank.

8. The method of claim 1 wherein the first fluid is a liquid and the second fluid is a gas.

9. The method of claim 8 wherein the sensor automatically adjusts the mass flow rate of the gas.

10. The method of claim 8 wherein the gas is carbon dioxide, ozone, nitrogen, chlorine, or flourine.

11. The method of claim 8 wherein the liquid is deionized water, ammonium hydroxide, hydrochloric acid, hydrochloric acid, or hydrogen peroxide.

12. The method of claim 1 wherein the at least one substrate is a semiconductor wafer.

13. A system for supplying a multi-fluid mixture to a substrate process tank comprising:
    a first supply line having means to control mass flow rate of a first fluid;
    a second supply line having means to control mass flow rate of a second fluid;
    wherein when the first supply line supplies the first fluid and second supply line supplies the second fluid, the first fluid and second fluid converge to form a multi-fluid mixture;
    a sensor for repetitively measuring the concentrations of the first and second fluids in the multi-fluid mixture; and
    a processor adapted to adjust the mass flow rate control means of the first and second fluids during processing of at least one substrate in the multi-fluid mixture when the sensor detects undesired concentration levels in the multi-fluid mixture. multi-fluid mixture.

14. The system of claim 13 wherein the first fluid and second fluid converge to form the multi-fluid mixture as a result of the first and second supply lines merging into a single tank inlet line.

15. The system of claim 14 wherein the sensor is located on the tank inlet line.

16. The system of claim 13 wherein the first fluid and second fluid converge to form the multi-fluid mixture in the process tank.

17. The system of claim 13 wherein the first fluid is a liquid and the second fluid is a gas.

18. The system of claim 17 wherein the sensor is coupled to the mass flow rate control means of the gas.

19. The system of claim 17 wherein the gas is carbon dioxide, ozone, nitrogen, chlorine, or flourine.

20. The system of claim 17 wherein the liquid is deionized water, ammonium hydroxide, hydrochloric acid, hydrochloric acid, or hydrogen peroxide.

21. The system of claim 13 wherein the means to control the mass flow rate of the first and second fluids are mass flow controllers or a combination of a pressure regulator and a flow meter.

22. The system of claim 13 wherein the at least one substrate is a semiconductor wafer.

23. The system of claim 13 further comprising a substrate process tank for holding the multi-fluid mixture.

* * * * *